Oct. 24, 1944.   C. D. PETERSON ET AL   2,360,976
TRANSMISSION MECHANISM
Filed Nov. 7, 1941   4 Sheets-Sheet 2
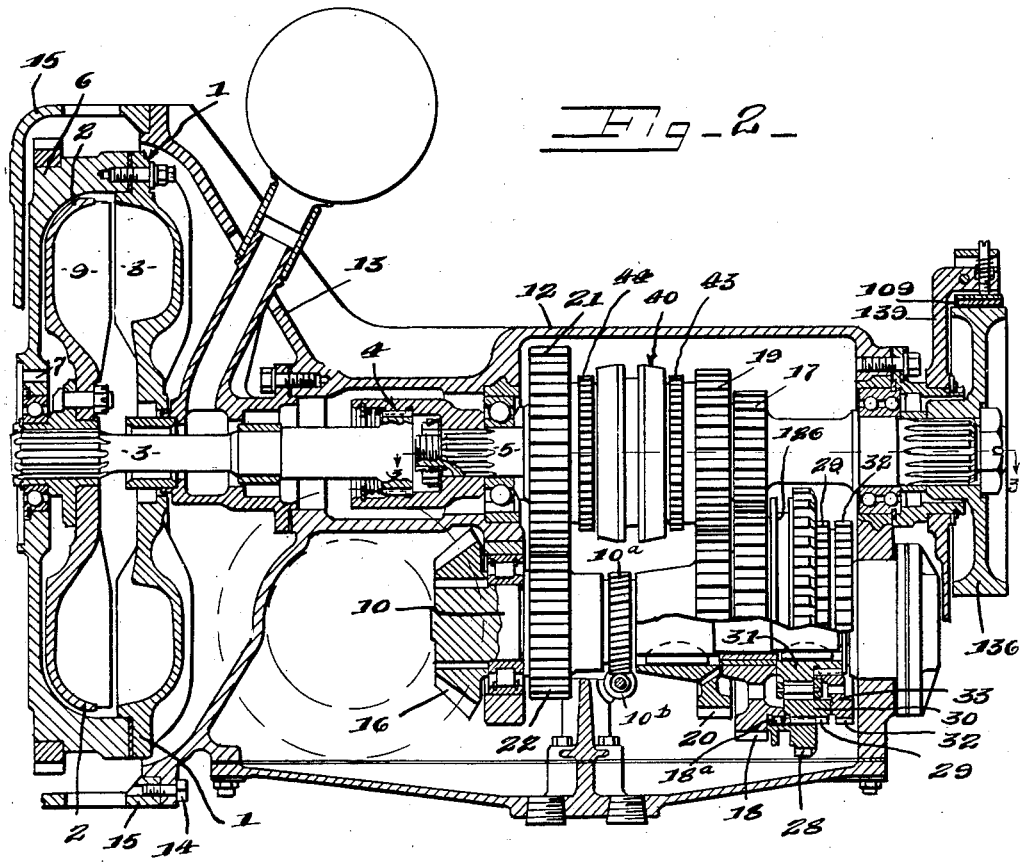
Fig-2-
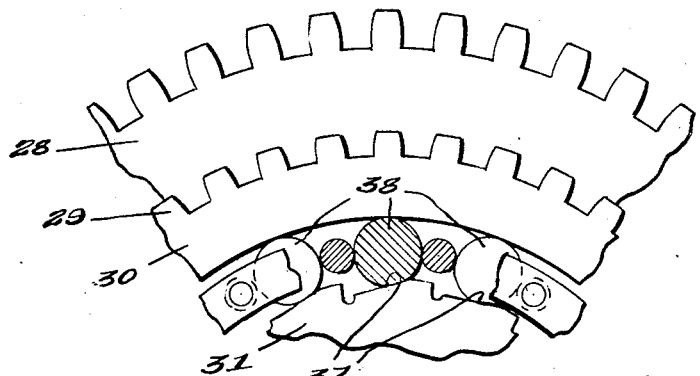
Fig-6-
Carl D. Peterson
Albert H. Deimel
INVENTORS.
BY Bredell & Thompson
ATTORNEYS.

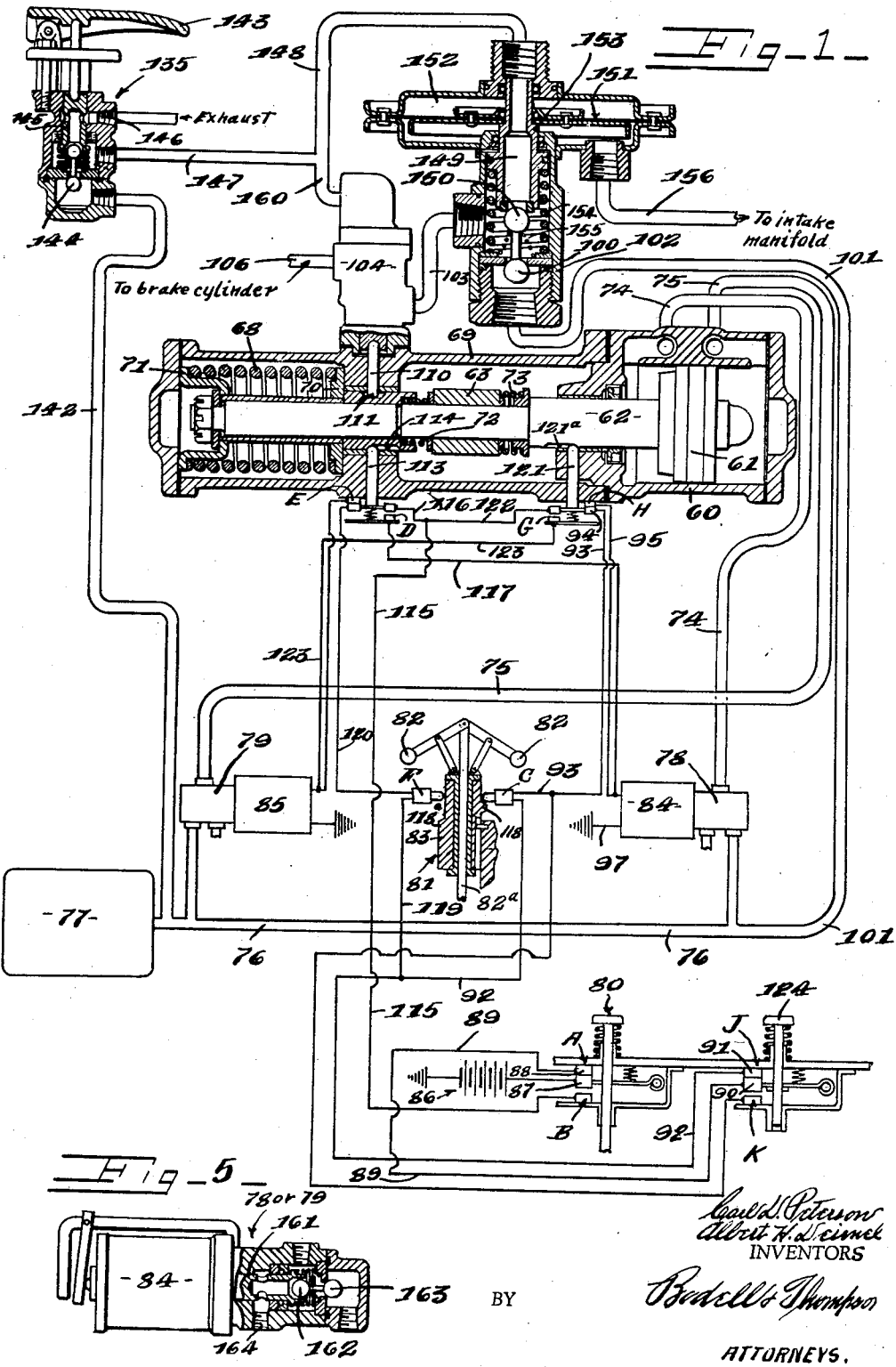

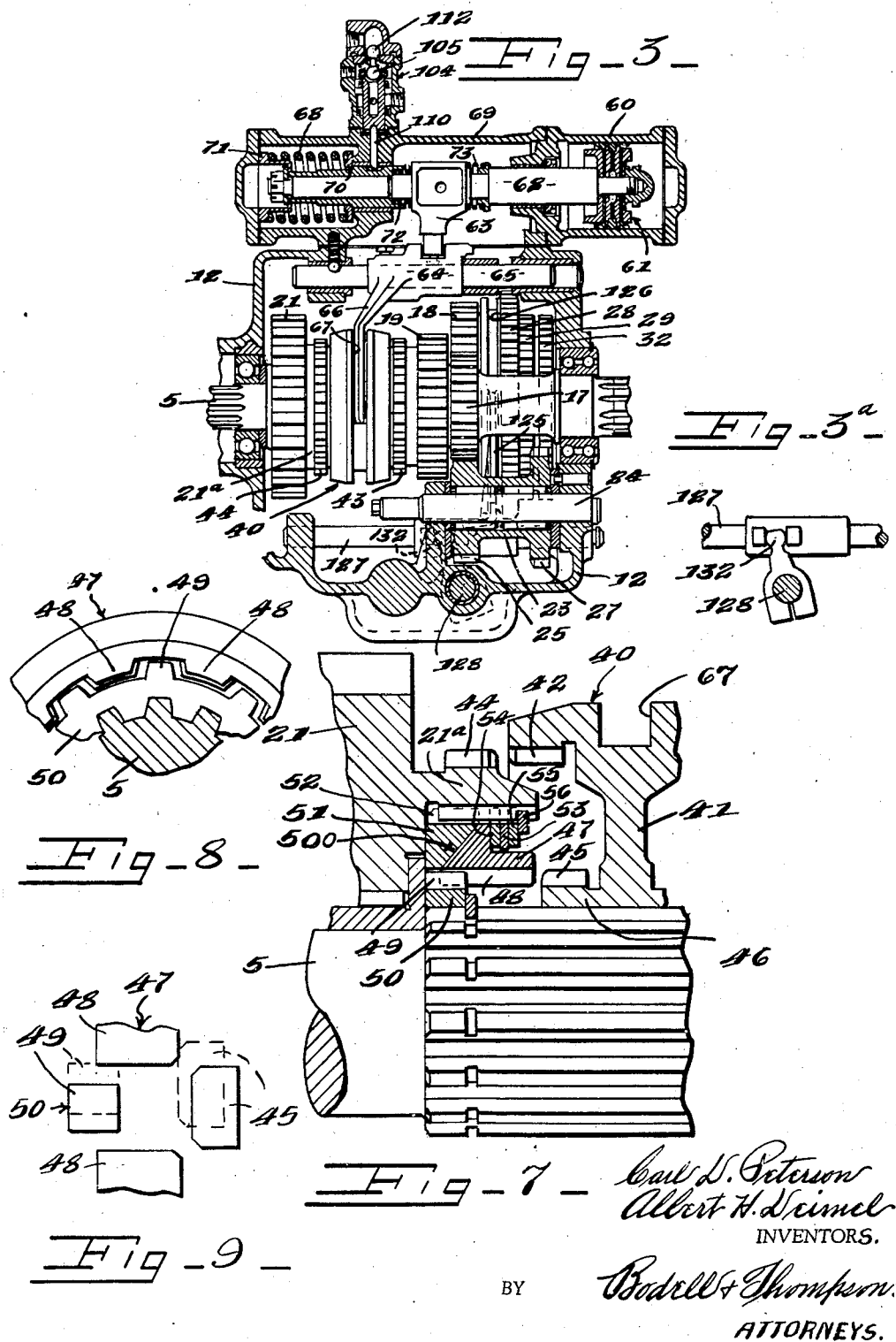

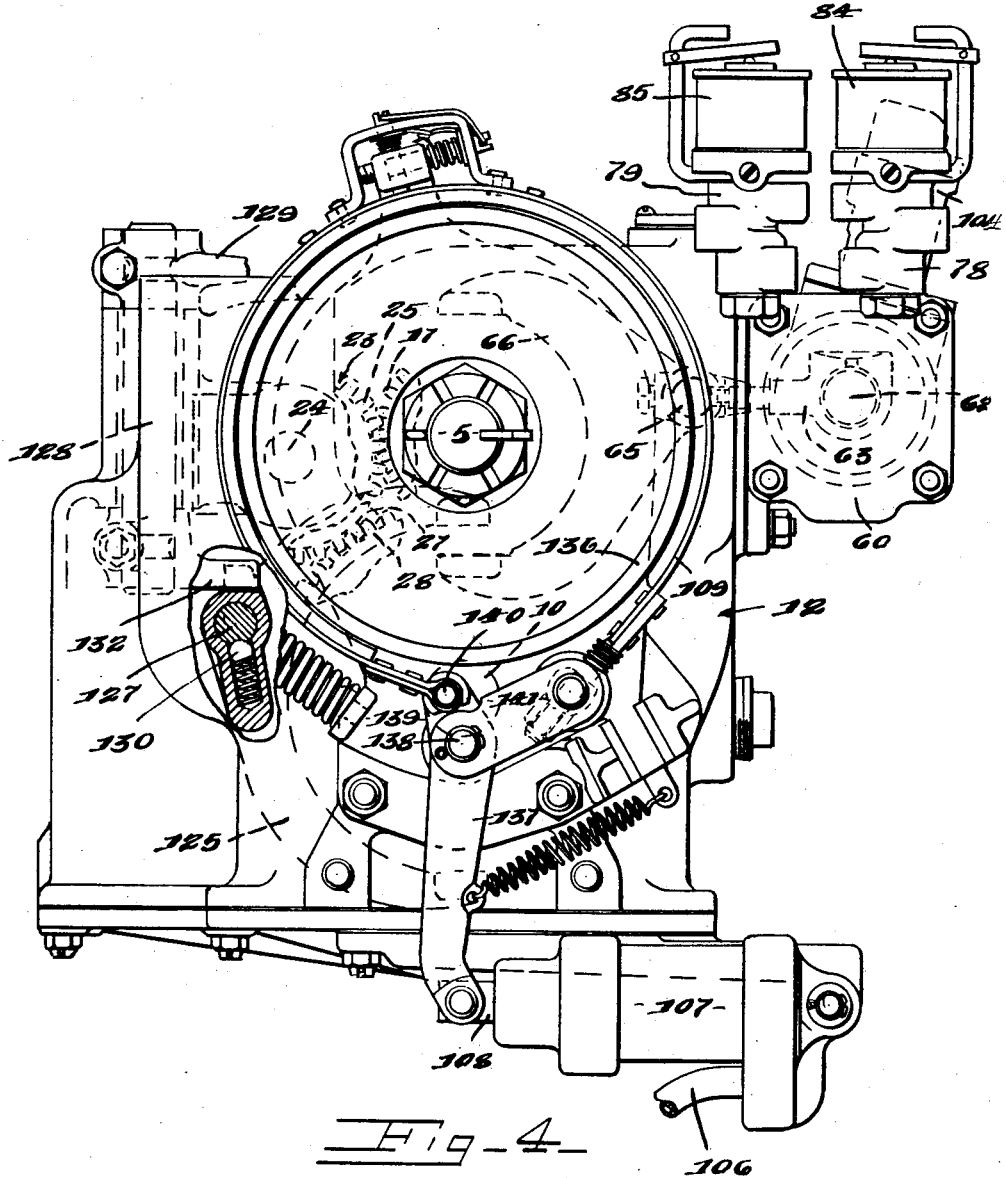

Patented Oct. 24, 1944

2,360,976

UNITED STATES PATENT OFFICE 2,360,976

TRANSMISSION MECHANISM

Carl D. Peterson and Albert H. Deimel,
Toledo, Ohio

Application November 7, 1941, Serial No. 418,226

15 Claims. (Cl. 74—189.5)

This invention relates to transmission mechanism for motor vehicles, which transmission mechanism embodies a hydraulic coupling, or a coupling capable of having a slipping action, a change speed transmission gearing, the input shaft of which is actuated by the runner, or its equivalent, of the coupling, a change speed gearing between the input and output shafts of the gearing, and a clutch of the balking ring type shiftable usually in opposite directions from central position, and when shifted in one direction, connecting the input and output shafts together through one speed ratio, and when shifted in the opposite direction, connecting the shafts together in another speed ratio; and has for its object a shifting system or means for controlling the operation of the shifting, which is semi-automatically controlled, that is, controlled by the speed of the vehicle and the position of the throttle for the engine of the vehicle, and also preferably embodying means for automatically effecting the crossing of the speeds of two parts to be clutched together through the balking ring clutches during the gear shifting operation.

Other objects will appear throughout the specification.

The invention consists in the combinations, constructions and system hereinafter set forth and claimed.

In describing this invention, reference is had to the accompanying drawings, in which like characters designate corresponding parts in all the views.

Figure 1 is a diagrammatic view of the control for the shifting system.

Figure 2 is a longitudinal sectional view of a transmission mechanism embodying the shifting system.

Figure 3 is a sectional view of the transmission gear on the plane of line 3—3, Figure 2.

Figure 3ᵃ is a detail view of the connection between the reverse shift actuator and the reverse shift rod.

Figure 4 is an enlarged elevation looking to the left in Figure 2.

Figure 5 is a detail view of one of the valves for controlling the shifting, the adjacent electro-responsive means being also shown.

Figure 6 is a detail view of the over-running clutch in the first gear train.

Figure 7 is an enlarged sectional view taken radially of the balking ring clutch.

Figure 8 is a fragmentary detail view of the balking ring.

Figure 9 is a diagrammatic operation view of a balking ring clutch.

The transmission mechanism includes generally a change speed gearing actuated from the engine of the vehicle through a hydraulic coupling or a coupling having the slip characteristics of a hydraulic coupling, the gearing including a shiftable element as a clutch, shifting means including a motor, a shifter actuated by the motor and connected to the shiftable element or clutch, a power system including a branch connected to the motor to energize it, a control member in said branch operable to effect the flow of power to the motor, a control system including a centrifugal member responsive to the output speed of the gearing, that is, the speed of the vehicle, means controlled jointly by the accelerator or member for operating the throttle of the engine when in throttle closing position and by the centrifugal member, for controlling the initial operation of the power control member at a predetermined speed, and means controlled by the shifting of the shifter from starting position to hold the power control member in its operated position independently of the centrifugal member or to take the control away from the centrifugal member. The shiftable element is usually a balking ring clutch, so that in shifting the balking ring clutch into engaged position, it is necessary to cross the speeds of the two parts to be clutched together. In shifting up to a higher gear, it is necessary to decelerate the engine to cross the speeds.

The invention further includes brake means for retarding the rotation of the input shaft of the gearing through the coupling, which brake means is automatically operable by the throttle control member, when in engine throttling position, with the shifter and clutch in central position, but with the clutch in balking position, so that when the clutch is in balking position, the brake to retard the rotation of the input shaft and effect the crossing of the speeds is automatically applied, when the throttle is closed to engine idling position, and automatically released upon throttle opening operation of the throttle control member.

In the illustrated embodiment of the invention, the power system for effecting the shifting of the clutch and the application of the brake is a fluid pressure or compressed air system and the control system is electrical embodying switches and electro-responsive devices. The control members in the branches of the power system are valves which are operated by the electro-responsive devices. The control system also embodies means for effecting a shifting down through second speed and for quickly shifting to use second speed as a brake, and for bringing the vehicle to a sudden stop from third or high gear, all as fully hereinafter explained.

1 designates the impeller of the coupling and 2 the runner which is splined on a shaft 3 coupled at 4 with the input shaft 5 of the transmission gearing, the impeller being opposed to the runner and having a portion 6 enclosing the same and coupled at 7 to the shaft of the engine of the vehicle. The coupling is of the general Fottinger type and the impeller and runner are provided with radial vanes 8, 9 respectively. The specific construction of the coupling forms no part of this invention, and in so far as the invention is concerned, any suitable coupling may be used.

The gearing, in addition to the input shaft 5, includes an output shaft 10 here shown as arranged parallel to the input shaft 5, and trains of gears between input and output shafts, the gearing here illustrated produces three speeds forward and reverse, with the first speed forward through an over-running clutch and with the vehicle normally in first speed. When the throttle of the engine is in idling position, the resistance is sufficient to cause the hydraulic coupling to slip, so that there is no forward movement of the vehicle. To start, it is merely necessary to accelerate the engine. When running in second and third speeds, one of the gears in the first speed train free wheels or over-runs. The gearing is housed within a suitable gear box 12 which has an extension enclosing the coupling 4 and a bell housing 13 which is secured at 14 to a stationary housing 15 for the coupling. The output shaft is shown as having a bevel gear 16 at its front end which meshes with a bevel gear on the propeller shaft (not shown) arranged with its axis extending transversely of the axis of the output shaft 10. The general arrangement of the gearing forms no part of this invention.

17 and 18 are intermeshing gears rotatable with the input and output shafts 5, 10 and constitute the first or low speed train; the gear 18 being connected to the output shaft 10 through an over-running clutch (Figure 6). 19 and 20 designate intermeshing gears on the input and output shafts constituting the second speed forward train. 21 and 22 designate intermeshing gears on the input and output shafts 5, 10 constituting the third or high speed train, the gears 19 and 21 being clutchable to the input shaft 5 through the balking ring clutch to be presently described.

The reverse train of gears comprises a reverse spool 23 mounted on a spindle 24 (Figure 3) suitably mounted in the gear box 12 and having one gear 25 of the spool meshing with the gear 17 and the other gear 27 of the spool coacting with a clutch gear 28 on the output shaft 10, the gear 28 being normally out of mesh with the gear 27 and shiftable axially into mesh therewith. The clutch gear 28 is a ring having internal teeth or splines normally interlocked with external splines 18ª in the gear 18, and external splines 29 on the outer race 30 of a free wheeling or over-running clutch, the inner race or cam 31 of which is keyed to the output shaft 10. The clutch gear 28 is shiftable to the right (Figure 2) to carry its internal splines out of interlock with the gear 18, which is rotatable about the shaft 10 and into clutching engagement with external teeth 32 on a clutch section 33 on the shaft. The shift to the right is in two steps, first unclutching from the gear 18 into neutral position, and second into clutching or locking engagement with the clutch section 33, at which time the gear 28 is in mesh with the gear 27 of the reverse spool. The inner race or cam 31 is keyed to the output shaft 10 and is formed with cams 37 (Figure 6) with which coact the rollers 38 interposed between the inner and outer raceways. Therefore, in the first speed forward, the drive is from the gear 17 to the gear 18 through the clutch gear 28 and through the over-running clutch. The reverse speed is transferred from the gear 17 of the input shaft 5, through the reverse spool 23 and clutch gear 28, which is now clutched to the shaft 10.

40 designates generally the shiftable element or double balking ring clutch shiftable from central position to clutch the gear 19 or the gear 21 to the input shaft 5. The balking ring clutch may be of any suitable construction.

Referring to Figure 7, 41 designates a toothed or jaw section splined on the shaft 5 and shiftable in opposite directions from central position to clutch the gear 19, when shifted in one direction to the shaft 5 and to clutch the gear 21 to the shaft 5 when shifted in the other direction from central. It is here shown as provided with internal clutch teeth or jaws 42 on opposite sides thereof for interlocking respectively with complemental teeth or jaws 43 on the gear 19 or 44 on the gear 21, and is also provided with external blocking teeth or projections, as 45, on opposite ends of the hub 46 thereof.

As the clutch is double, there are two balking rings, one on each end thereof for coacting with the gears 19 and 21. 47 designates the balking ring, this being rotatable with the section 41 and provided with internal teeth 48 interlocked with the teeth 49 of a collar 50 on the shaft 5 and rotatable therewith, and hence rotatable with the section 41. The internal teeth 48 are of less width than the spaces between the teeth 49, so as to permit a relative rotary rocking or locking and unlocking movement of the balking ring 47 relatively to the toothed section 41. The balking projections or teeth 45 are of the same width as the spaces between the teeth 48. The balking ring is here shown as provided with a conical friction face 500 coacting with a complemental friction face here shown as provided on a ring 51 rotatable with the gear 21 or 19, it being here shown as having peripheral splines or teeth 52 interlocking with internal splines on an annular flange 21ª on the side of the gear 21. The clutch teeth 44 are provided on the periphery of said flange. The balking ring 47 is pressed lightly into engagement with the friction face of the ring 51 in any suitable manner, as by a spring washer 53, interposed between abutment rings 54, 55 interlocked with the splines of the flange 21ª and held in position by a lock ring 56. The purpose of this light frictional engagement causes the balking ring 47 to be rocked into and out of locking position, when the speeds of the two parts to be clutched together, as the shaft 4 and the gear 21 or 19, are different. Due to the friction between the balking ring 47 and the ring 51, the balking ring will be in a position, whereby the spaces between its teeth 48 are out of alinement with the balking projections 45, so that the balking projections engage on one side or the other of such spaces or passages, as seen in Figure 9. As the speeds approach each other and cross, the frictional drag between the ring 47 and the ring 51 of the gear 21 will cause the balking ring to rock therewith, and when the spaces or passages between the splines 48 aline with the balking projections 45, the shifting in of the section 41 will be completed or the teeth 42 will be brought into clutch engagement with the teeth 44. The construction of the balking ring clutch per se forms no part of this invention, but the fact that it is a balking ring clutch must be borne in mind in connection with the shifting operations in a transmission mechanism embodying a slip coupling or a hydraulic coupling.

The shifting or control mechanism will now be described.

The mechanism for shifting into second and third by power is semi-automatically controlled by the vehicle speed (or the output speed of the gearing) and the throttle position. Reverse is effected by a manual lever. The power shifting mechanism comprises a fluid or air operated motor including a movable member shiftable in opposite directions from central position, a shifter movable therewith and also connected to the balking ring clutch 40. The air operated motor here shown is of the cylinder and piston type including a casing or cylinder 60 and a piston 61 mounted on a piston rod or shifter 62 having a block 63 thereon, which is connected to the balking ring clutch 40. As here illustrated, this block 63 is interlocked with a block 64 on the shift rod 65 mounted in the gear box 12. The block 64 has a fork 66 working in a peripheral groove 67 in the shiftable section of the balking ring clutch 40. The piston 61 is normally arranged in an intermediate position in the cylinder 60 and the movement thereof in either direction is against a returning spring 68. The rod 62 is located in a cylindrical housing 69 which is coaxial and a unit with the cylinder 60 and mounted on one side of the gear box 12. The movement of the piston 61 to the right compresses the spring 68 through an annular shoulder or abutment 70, the spring being interposed between the abutment 70 and an abutment 71, and the movement of the abutment 70 to the right is limited, when the piston reaches central position in the cylinder.

In operation, during shifting of the piston 61 and the rod 62 to the left, the abutment 70 moves to the left compressing the spring, which, when free to re-act, returns the piston to central position. Movement of the piston 61 and rod 62 to the right from central position causes the abutment 71 to move with the rod and compress the spring toward the abutment 71 and to return the piston to central position, when the spring 68 is free to re-act. Movement of the shifter or rod 62 effects the shifting of the balking ring clutch 40 in one direction or the other from central position. The shifter or rod 62 is capable of a yielding movement relatively to the block 63 against springs 72, 73, these springs acting to yield when shifting of the balking ring clutch is blocked before the speeds of the two parts to be clutched together, cross. Air is supplied to the cylinder 60 on opposite ends thereof when the piston 61 is in central position through branch pipes 74, 75 leading from a header 76 connected to a suitable source 77. The branch pipes 74 and 75 have normally closed valves 78, 79 therein, the openings of which are controlled automatically by the vehicle speed, and driver controlled through the throttle of the engine. The valves are electrically operated or controlled by electro-responsive devices as electro-magnets, the energization of which is controlled partly by a speed controlled switch and by a throttle controlled switch. The invention is shown as embodied in a transmission gearing, which is normally in low gear at engine idling speed and the shift made up into second and third speed. The hydraulic coupling slips due to the resistance to move the load through low gear at engine idling speed, and to start, it is merely necessary to open the engine throttle. The drive in low gear is through the over-running clutch which over-runs when the drive is in a higher gear.

Referring to Figure 1, 80 designates a foot throttle control member. 81 designates speed operated control device or governor including centrifugal weights 82 connected to a shiftable cam member 83. The shaft $82^a$ of the governor is connected to a worm gear $10^a$ here illustrated as on the output shaft 10 of the gearing through a worm $10^b$ (Figure 2). The actuation of the shaft $82^a$ from the output shaft or any shaft actuated thereby is in the nature of the conventional drive for the speedometer. Usually the gear $10^a$, wherever located, actuates the speedometer and the governor. The drive to the governor shaft $82^a$ is similar to a speedometer drive. The centrifugal governor operates to open and close automatically at predetermined speeds, switches designated C and F; the throttle 80 operates to open and close switches designated generally A, B, these switches A, B, C, F controlling the flow of current through electro-magnets or solenoids 84, 85, which operate the valves 78 and 79. These switches are in a circuit as follows: From battery 86 to contact 87, normally engaged with contact 88 of switch A, through wire 89, contact 90, normally engaged with contact 91 of switch J, the purpose of which will hereinafter be described, and thence through wire 92 to one side of the switch C controlled by the centrifugal governor, thence through wire 93, movable contact 94, normally engaged with contact of switch H, and thence through wire 95 to the windings of the electro-magnet 84 which controls the valve 78, this valve controlling the shifting to the second speed from first, thence through wire 97 to return wire or ground. The switch C however is normally open. Upon depressing of the throttle 80, the vehicle is started in low gear, and when a predetermined speed is reached, say five M. P. H., the centrifugal weights 82 shift the cam 83 far enough to bring the point 118 to close switch C. Depressing of the throttle opens the switch A by separating the contact 87 from the contact 88, the throttle being again now momentarily closed by the driver, a circuit is established from the battery through the switch A, switch J, wire 92, switch C, wire 93, switch H, wire 95, through the windings of the magnet 84 of the valve 78 opening the valve 78 so that air is free to pass from the source 77 to the left end of the cylinder 60 and side of the piston 61 tending to shift the piston 61 and shifter 62 to the left, the vehicle having reached a predetermined speed, as approximately five M. P. H. or above, at which time the centrifugal governor closes the switch C, so that upon releasing the foot throttle momentarily, the switch A again closes and completes the circuit through the windings of magnet 84 of the second speed valve 78 through the switches A, J, C, H. Air thus enters the left end of the cylinder 60, moves the piston slightly until the balking ring clutch is blocked, movement of the balking ring clutch 40 being then to the right (Figure 2). This momentary releasing of the throttle opens a pressure reducing valve 100 as will be presently described, permitting air to pass from the source 77 through the header 76, branch 101, through the casing 102 of the pressure reducing valve head, past the open valve head 100, through pipe 103 to the casing 104 of a fast shift valve, which is open when the piston 61 and the shifter 62 are in substantially central position, thence past an open valve head 105 of the fast shift valve through pipe 106 to a cylinder 107 having a piston therein, the rod 108 (Figure 4) of which contracts a brake band 109 on a brake drum mounted on the input shaft 5, here shown as at one end of the gear box. The rotation of the input shaft and the runner 9 of the hydraulic coupling is thus retarded and the crossing of the speeds effected, so that the balking ring of the clutch 40 unlocks and permits the toothed engagement of the section 41 of the balking clutch with the clutch teeth of the second speed gear 19. During the shifting in of the balking ring clutch by the rod 62, the valve 105 in the fast shift valve casing 104 is closed, permitting air to exhaust from the brake cylinder 107 back through the pipe 106. This closing of the fast shift valve is effected through a plunger 110 (Figures 1 and 3) normally seated in a notch 111 having cam-shaped ends, the notch being located to receive the plunger, when the shifter or rod 62 is in central position and to cam radially outward when the shift is out of approximately central and balking position. The radial movement outward closes the fast shift valve by moving the seat thereof up against the head 105, this movement also opening the valve head 112 located in the fast shift valve casing 104 and movable as a unit with valve head 105. The specific construction of the fast shift valve forms no part of the invention.

The shifting of the shifter 62 also operates a pair of switches E, D to open switch E and close switch D. The pair of switches E, D are operated by a plunger 113 working in a long notch 114 in the shaft 62 and having cam-shaped end walls and normally coacting with the end wall at the left end of the notch, so that during the shifting of the piston 61 and shifter 62 to the right, the plunger 113 is cammed outwardly to close the switch D and open the switch E. Upon opening of the throttle, the current passes from the source 86 through switch B, which is closed, by reason of contact 87 engaging therewith, through wire 115 to wire 116 and the now closed switch D, wire 117 to the windings of the magnet 84 of the second speed air valve 78, so that this valve remains open and holds the piston 61 and the balking ring clutch in its shifted position against the return action of the spring 68. The speed of the vehicle may be then increased by further opening the throttle by depressing the throttle button 80, and when the vehicle reaches a predetermined speed, as 18 M. P. H. or over, the action of the centrifugal weights 82 brings a lift 118 of the cam of the speed operated control in position to permit the switch C to open, and another lift 118ᵃ to close the switch F. However, no change occurs, because the circuit is maintained to the windings of the magnet 84 of the second speed air valve 78 through the switch D. Now to make the shift into third speed, the operator momentarily releases the throttle button 80, again closing the switch A momentarily, so that now the current passes from the source 86 through switch A, wire 89, switch J, wire 92, through wire 119, through switch F, which has been closed by the action of the centrifugal weights; thence through wire 120, to switch E, which is open, when the balking ring clutch is in second speed position. The momentary release of the foot throttle 80 opens switch B and closes switch A, but as the switch C is also open, due to the operation of the centrifugal governor and hence the second speed air valve 78 closed, the air is free to exhaust from the left hand end of the cylinder 60, and hence the spring 68 free to re-act to the left to return the piston 61 to central position and the balking ring clutch to central position. The return of the piston 61 and shifter 62 to central position closes switch E and opens switch D, permitting the plunger 113 to seat in its notch 114 and also to permit the plunger 110, which operates the fast shift valve in the casing 104 to return to its normal position, wherein the fast shift valve is open. The switches A, F and E now being closed, the circuit to the magnet of the third speed air valve 79 is closed through switches A, J, F and E, so that the air operated valve 79 being open, air is free to enter the right hand end of the cylinder 60 from the source 77, header 76, and branch 75, thus shifting the piston 61, shifter 62 and the balking ring clutch 40 to the left. As the switch A is closed by releasing of the throttle, the air is free to pass from the source 77 through pipe 76, past the valve head 100 of the pressure reducing valve 102, which has been opened by the release of the throttle, thence through pipe 103, fast shift valve in casing 104, the valve head 105 of which is in open position, because the shifter 62 is still in central position, and thence through a pipe 106 to the retarding brake cylinder 107 to apply the brake to the input shaft 5 and the runner, and retard the speed thereof sufficient to cause the crossing of the speeds, the unlocking of the balking ring of the clutch, and hence permit the balking ring clutch 40 to complete its shifting-in engagement with the teeth 44 of the gear 21. This complete shifting-in operation causes the plunger 110 to close the fast shift valve, as before described. Also, this complete shifting in causes a plunger 121 to close switch G and open switch H, so that the windings of the magnet for the third speed air valve 79 remain energized after the throttle 80 has been again opened, through the switch B, wire 115, wire 122, switch G and wire 123. The switch H being open, as well as switch C, the windings of the second speed valve 78 are cut out of a closed circuit. The transmission will therefore now stand in third speed regardless of the position of the foot throttle, as long as the vehicle speed remains above a predetermined speed, as 18 M. P. H., or slightly less.

Shifting down to second will now be described. In shifting down from a higher gear to a lower gear, as from third to second, the speed of the vehicle is decelerated, to a predetermined speed, say 18 M. P. H., so that the switch F is opened by the centrifugal governor and the switch C closed. The vehicle, however, remains in third speed since the third speed air valve 79 remains in a closed circuit through the switches B and G. Now to shift into second gear between the vehicle speeds of 18 M. P. H. to 5 M. P. H., the driver releases the foot throttle 80, thus opening switch B and closing switch A. This causes de-energization of the windings for the third speed air valve 79, and hence said valve closes, so that the air releases from the right hand end of the cylinder 60, permitting the spring 68 to return the piston 61, shifter 62, and balking ring clutch 40 to central position. As the piston 61 and shaft or shifter 62 reach their central position, the plunger 121 seats into its notch or groove 121ª in the rod 62, thus opening switch G and closing switch H. With the closing of the switch H, the throttle operated switch A and the centrifugal governor switch C having already been closed, the circuit to the windings of the second speed air valve is completed through switches A, J, C, H, so that air enters the left hand end of the cylinder 60 and moves the piston 61 and shaft or shifter 62 to the right, thus tending to move the balking ring clutch 40 to the right. As the throttle is closed, the shifter 62 is moved into balking position, and locked by the balking ring of the clutch 40 from completely shifting. The fast shift valve head 105 in the casing 104 is still open and the closed throttle creating vacuum in the chamber under the diaphragm 151 opens the valve head 100 of the relay valve 102, permitting air to enter the brake cylinder 107 and retard the runner 2 of the hydraulic coupling and the input shaft 5. However, in shifting down instead of decelerating the engine, the throttle is again opened to accelerate the engine, until the speeds cross when the complete shifting in of the balking ring clutch 40 to clutch the gear 19 of the second speed train is completed by the air in the left end of the cylinder now being free to act upon unlocking of the balking ring. Opening the throttle reduces the vacuum in chamber under diaphragm 151 thereby disengaging the brake so that the brake is not applied while accelerating engine to make a shift down.

In the second speed balking position, the switch D is closed and switch E open, due to slight movement of shaft 62 to the right, moving plunger 113 outward. When the driver opens the throttle, the circuit to the windings of the second speed air valve 78 is broken through switches A, J, governor control switch C and switch H. As the vehicle speed continues to decrease, the governor control switch C for the second speed air valve 78 opens at a predetermined low speed, as for instance 5 M. P. H., but the second speed air valve remains energized through the circuit including switches B, D. Upon the release of the throttle, the circuit through the switches B, D and also the circuit through switches A, J, C, H to the windings of the second speed air valve 78 being open, the spring 68 returns the piston 61 and clutch 40 to central or neutral position. Now the vehicle is in first speed forward and the engine, and hence the hydraulic coupling, idling, and not developing sufficient power to drive the vehicle through low or first gear. If the foot throttle is now opened, to accelerate the engine, the vehicle will be driven through the low gear train 19, 18 and the over-running clutch.

The second speed gearing may be used as a brake at any time, regardless of what speed the transmission happens to be in. To so use the second speed as a brake, an independent driver-operated switch is provided including switches J, K operated by a button 124 the switch J being normally closed and being in the circuits to both governor control switches C and F through the wire 92, so that upon depressing of the operating member or button 124, to open the switch J, the circuits to the windings of the valves 78, 79 are opened, and the releasing of the foot throttle 80 breaks the circuit through the switch B to the switches D and G. Now, when the foot throttle 80 is depressed and the clutch 40 in one or the other of its engaged positions, it maintains one or the other of the windings of the air valves in a closed circuit through switches B, D or B, G. Therefore, if the transmission is in third speed and upon the release of the foot throttle 80, the air valve 79 will be opened, permitting air to exhaust from the right end of the cylinder 60, so that the spring 68 re-acts to return the piston 61, shifter 62 and the balking ring 40 to central position. At this point, windings of the second speed air valve 78 are energized through the switches A and K and H, as the button 124 is still depressed. The shift into second can then be completed, as before described. Upon the opening of the second speed air valve 78, the air enters the left end of the cylinder 60 and tends to shift the piston 61 and shifter 62 carrying the balking ring clutch to the right to balking position. In this position, the switch D is closed and switch E opened. The driver upon closing of the throttle by releasing the button 80, establishes a circuit through the switches A, J, C and H, as the button 124 has been released, back to normal position. Then upon opening of the throttle by depressing the throttle 80, the switch A is opened but the windings of the second speed remains in a closed circuit through the switches B, D. Upon acceleration of the engine, the speeds will be crossed and the balking ring unlocked, so that the shift into second from third is completed.

If the transmission is in low gear and it is desired to use second speed as a brake, when the button 124 is depressed, and the throttle 80 released, the second speed air valve will be energized through a circuit including the switches A, K, H and the shift will be completed, as before described in connection with shifting up through second. That is, the closing of the circuit through the switches A, K, C and H opens the second speed air valve 78, so that air enters the left end of the cylinder 60 and tends to move the piston 61 to the right, carrying the balking ring clutch into balking position. The throttle having been released and the switch A closed, and the clutch 40 in balking or central position, the air is free to flow through the fast shift valve 100 and through the pipe 106 and the brake cylinder and retard the runner, allowing the speeds to cross and the completing of the shifting into second speed.

If the transmission is in second speed before the button 124 is depressed, or if shifted into second by way of the button 124, the transmission will remain in second, regardless of the vehicle speed or throttle position, until the button 124 is released, because this button cuts out the control of the governor operated switches C, F.

In order to bring the vehicle to a sudden stop from third speed, the driver releases the throttle 80, thus decelerating the engine and the hydraulic coupling, and when the vehicle decelerates to a predetermined speed, say 18 M. P. H., the governor control switch F will be opened, and the governor control switch C closed, thus permitting the exhaust of air from the cylinder 60, and hence the piston 61 to return to central position, as the air is free to exhaust from the right hand end of the cylinder through the valve 79. As during deceleration, the throttle operated switch A, the governor operated switch C and the switch H controlled by the shifter 62 is closed, when the shifter 62 is in central position, the brake is applied by operating the applicator valve to be described, the windings of the second speed air valve 78 are energized and hence this valve 78 will open to the flow of air to the left hand end of the cylinder 60 and the balking ring 40 is in balking position, and its shift not completed, as this is a shift down requiring acceleration and not retardation. When, however, the speed of the vehicle drops to a predetermined low, as 5 M. P. H., the governor controlled switch C will be opened, thus de-energizing the windings of the second speed air valve 78, allowing the piston 61 to return to neutral from balking position, as now the engine is idling and the vehicle in first speed through the over-running clutch, the vehicle coasts until brought to a complete stop by the vehicle brakes.

To shift into reverse or to shift from reverse into first speed, that is, to shift the clutch gear 28, a driver operated shifting mechanism is used. As seen in Figure 4, this consists of a fork 125 working in the groove 126 in the clutch gear 28, the fork being mounted upon a shift rod 127 (Figures 3 and 4) extending lengthwise of the gear box or parallel to the output shaft, and operated by a vertically movable rock shaft 128 mounted in the gear box and extending upwardly out of the same, it having a rock arm or lever 129 at its upper end which is connected to a suitable manual lever, not shown, located at any convenient place within reach of the driver. The shift rod 127 is provided with three notches along its length with which a spring-pressed poppet 130 coacts, these notches being located to receive the poppet when the shiftable clutch gear 28 is in normal or first speed position, central or neutral position and in reverse position. The motion of the rock shaft 128 is transferred to the shift rod 127 through a rock arm 132 through a rock arm on the vertical rock shaft 128 and slidably coacting with a notch between two radial shoulders on the shift rod 127. Rocking of the shaft 128 by the rock arm 129 obviously moves the shift rod 127 axially into any one of three positions, where it is held by the spring-pressed poppet 130. Any suitable mechanism may be used for shifting the clutch gear 28. When shifting into reverse, the brake band 109 is applied to the brake drum to first stop the runner 2 and the input shaft 5 and then rock it momentarily backward to relieve the torque on the gears being brought into mesh, the brake being applied during this operation by the piston in the cylinder 107 (Figure 4) and controlled by a driver operated applicator valve designated generally 135 (Figure 1). For the shift up into second and third, the brake band 109 is applied to the brake drum 136, this being located on the rear end of the input shaft 5, with the reduced pressure or a pressure sufficient to retard the rotation of the shaft 5. The movement of the piston rod 108 is transferred to a lever 137 pivoted at one end 138 to a rocking carrier 139 and having an arm extending beyond its pivot connected at 140 to one end of the brake band. The other end of the brake band is connected by a link 141 to the pivot 138 of the lever. When the brake is applied with a reduced pressure in the cylinder 107 through the fast shift valve, the lever 137 merely moves about its axle 138 to contract the brake band. When, however, higher or full air pressure is applied to the cylinder 107, the brake band contracts on the brake drum 136 with sufficient force to first retard, then stop it, and then the high pressure in the cylinder 107 causes the carrier 139 to be rocked backwardly, thus rocking the input shaft 5 and the runner 2. This operation is for relieving the torque on the gears of the reverse train when shifting into reverse or when shifting from reverse into first gear.

The casing of the applicator valve 135 is connected by a pipe 142 to a source of supply or air tank 77 or the header 76. Depression of the operating lever 143 of the applicator valve causes the valve head 144 to open and the slide 145 to close the exhaust outlet 146. The air passes from the pipe 142 past the open valve 144 through pipe 147 and pipe 148 to the upper end of the differential relay valve 102 and thence through passage 149, depressing valve head 150 to open it, and as this is coupled to the valve head 100, it also opens the reducing valve head 100 to the inlet of air from the source 77 through header 76, pipe 101, and thence through pipe 103, the fast shift valve casing 104, the valve 105 of which is in open position, then to the brake cylinder with full force not controlled by the vacuum as presently described. Thus, in making the shift into reverse, upon opening of the applicator valve by depressing the lever 143, the output shaft will be retarded and reversed momentarily, taking the torque off of the gears of the reverse train to be brought into mesh. Operation of the applicator when the transmission gearing is in gear through the balking ring clutch and with the fast shift valve head 105 closed permits the air to pass from the source through pipes 142, 147, branch 160 to the top of fast shift valve casing 104, past the now open valve head or ball 112 through pipe 106 to brake cylinder, to apply the brake to slow down when in second or third gear.

The valve mechanisms will now be briefly described. Any of these valve mechanisms may be of any suitable construction, and the specific construction forms no part of this invention.

The pressure reducing valve includes a diaphragm 151 in a diaphragm chamber 152, this diaphragm acting on an endwisely movable slide or plunger 153 formed with the passage 149 and which has a seat in its lower end coacting with the valve head 150. The movement of the plunger is against the action of a spring 154. The valve head 100 is also moved against its seat by a spring 155. The diaphragm chamber 152 is connected by a suitable pipe 156 to a suitable source of vacuum, as the manifold of the engine. When the throttle valve is closed, the vacuum will act to open the valve head 100, permitting air to flow through the fast shift valve 104, when the shifter 62 is in neutral. When the shifter 62 is out of neutral, the valve head 105 of the fast shift valve 104 is open, and when the shifter 62 is out of neutral or central position, the valve 105 is closed through the action of the plunger 110, and when closed, the valve 112 is open (see Figure 3) to the exhaust of air from the cylinder. In the event the vehicle is in second or third gear or at any time the shift rod 62 is out of neutral position, the brake may be applied by operating the applicator valve. If the vehicle is stopped in second or third gear and the resistance of the toothed jaw or faces of the clutch 40 on the part with which it is engaged is so great that the spring 68 can not re-act to return the shifter 62 to neutral, when air is exhausted from the cylinder 60, then the gears may be relieved of the torque by opening the applicator valve 135 by depressing its pedal 143 so that the air passes through the pipe 142, applicator valve, pipe 147 and another pipe 160 to the upper end of the casing 104 of the fast shift valve, thence past the valve head 112 (Figure 3) which is now open, because the shifter 62 is out of central position, and thence through pipe 106 to the brake cylinder to rock the input shaft 5 inwardly backwardly and relieve the torque and permit the spring 68 to re-act.

The second and third speed air valves may be of any suitable construction, each being a two-way valve or combined intake and exhaust valve operated electro-magnetically. The energizing of the windings 84 or 85 causes the armature or core of the magnet to be shifted to shift the plunger 161 in position to close against the valve head 162 and open valve head 163 which is connected to the valve head 162. Upon this operation, air can pass from the air line to the pipe 74 or 75 from the header 76, past the open valve head 163 and thence out through the section of pipe 74 or 75 leading to the cylinder 60. When the windings are de-energized, the air is free to exhaust back through the section of the pipe 74 or 75, past the valve head 162, through the plunger 161, and out through the exhaust opening 164. The specific construction of the various valves forms no part of the invention. All the valves are self-closing or self-returning, as by springs, to normal position when the force holding them operated or open is released. Also, the various switches are self-operated to normal position, as by springs, when the force holding them in operated position is released or removed.

Although the power system is here shown as a pressure fluid system and the control for the power system and electrical system, it will be understood that in the general or broad aspect of this invention, the cylinder 60 and piston 61 constitute a motor for effecting gear shifts, connected in a power system including one or more branches; the valves 78, 79 are broadly control members in the branches operable to effect the flow of power to the motor. The switches C, F constitute generally or broadly means controlled by the throttle control member 80 when in throttle closing position and by the centrifugal member 83 at different speeds to initially operate the control members 78, 79 in the branches of the power system. The pairs of switches D, E and G, H constitute broadly means controlled by the shifting of the shifter, as 62, from central position in either direction to hold the control member 78 or 79 independently of the centrifugal member in the position it has been operated by the centrifugal member, and to prevent the operation of the other control member. The button 124 constitutes the additional driver control member operable to cut off the flow of power through the centrifugally controlled means, so that upon release of the throttle, the motor returns to central position.

Briefly, the operation is as follows:

The vehicle normally starts in low gear; to start the vehicle, the operator merely depresses or opens the throttle, thus speeding up the vehicle to a predetermined speed, say 5 M. P. H., or above, and then to make the shift into second speed forward, the throttle is momentarily released. The release of the throttle closes the circuit through the speed controlled switch C to energize the windings of the second speed air valve 78, so that air can flow to the left end of the cylinder 60, and this shifts the balking ring clutch to balking position, and at the same time, the release of the throttle causes the vacuum to be created in the vacuum chamber of the reducing valve 102, so that the vacuum opens the reducing valve, permitting the air to flow to the brake cylinder through the fast shift valve 104, as the piston 61 and shifter 62 is in central position, so that shifting-in into second speed is completed when the balking ring is thus unlocked. The vehicle can then be accelerated to greater speeds and when the vehicle reaches a predetermined higher speed, as 18 M. P. H., the driver can, if he wishes, shift into third speed forward by again releasing the throttle, permitting the piston 61 and the balking ring clutch to return to central position, and in so doing completing a circuit through the governor controlled switch F to the windings of the third speed air valve, and hence the piston actuated to third speed balking position, this breaking all the circuits to the second speed air valve, and also operating the reducing valve 102 to permit air to flow to the brake cylinder, as before, to retard the engine, momentarily crossing the speeds, so that the vehicle now proceeds in third speed and can be speeded up by opening the throttle. It remains in third speed, as long as desired, until the shift to neutral is made, as before described in detail.

In shifting down from a higher to a lower speed, as from third to second, the vehicle is slowed down to a predetermined road speed, say 18 M. P. H., and the shift then made into second at any speed within the predetermined speed, as 18 M. P. H. and 5 M. P. H., by releasing the foot throttle controlled member 80, and hence causing the de-energization of the windings of the third speed air valve 79 and hence effecting closing of the third speed air valve, thus permitting the air to exhaust from the cylinder 60 and the piston 61 and shifter 62 to return to central position, in which position a closed circuit is immediately established to the windings 84 of the second speed air valve 78 and the air is free to enter the left hand end of the cylinder 60 and shift the piston 61 and shifter 62 to the right, carrying the balking ring clutch 40 therewith to balking position. The fast shift valve in the casing 102 is also opened at the time that the clutch is in central balking position, as the throttle member 80 in throttle closing position, so that air is free to enter the brake cylinder 107 and apply the brake, as hereinbefore described. However, to cross the speeds, in shifting down, the engine must be accelerated instead of decelerated, and hence the throttle control member 80 is depressed to accelerate the engine, and effect the crossing of the speeds, permitting the shifting of the balking ring clutch into second speed position. To continue shifting down into first speed, the speed of the vehicle is further decreased, for instance to five M. P. H. with the windings of the second speed air valve remaining energized, and upon return of the throttle to closed position, the circuits controlling the windings of the second speed air valve 78 are opened, so that the valve 78 closes, thus permitting the piston 61 to return to central position under the action of the spring 68. The vehicle is now in first speed driving through the over-running clutch.

To use the second speed as a brake, when in any speed, the button 124 is depressed to break the circuits to the switches C, F, so that upon return of the foot throttle control member 80 to throttle closing position, the circuits to the other switches are broken. Therefore, upon the release of the foot throttle control member 80, the open air valve 78 or 79 is closed (the air valve 79 being open for third speed while valve 78 is closed, and the air valve 78 for second speed open, while the valve 79 is closed), permitting the air to exhaust from the cylinder 60 and the spring 68 to re-act to return the piston 61, shifter 62 and balking ring clutch 40 to central position. This cuts the windings of the second speed air valve 78 into a closed circuit, when a shift is being made down from third, bearing in mind that the button 124 is still depressed, so that the shift into second gear can then be completed. When the shift is up from first to second speed, to use second speed as a brake, the button 124 is depressed and the throttle control member 80 returned to throttle closing position, the windings of the second speed air valve are in a circuit around the speed controlled switch C, so that the valve 78 is immediately opened, air passes to the cylinder 60 and as the throttle control member 80 is in throttle closing position, the air is free to flow through the fast shift valve to the brake cylinder to cross the speeds and let the piston 61 complete the shifting into second gear. If the transmission gearing is in second speed, the transmission will remain in second, regardless of the vehicle speed or the throttle position, or until the button 124 is released.

What we claim is:

1. In a transmission mechanism for motor vehicles including a throttle controlled engine and a throttle control member, a change speed gearing embodying an element shiftable from starting position into motion transmitting position, shifting means including a motor including a movable element, a shifter connected thereto and to the shiftable element, a power system including a branch connected to the motor, a control member in said branch operable to effect the flow of power to the motor, a centrifugal member responsive to the output speed of the gearing, means controlled jointly by the throttle control member when in throttle closing position and by the centrifugal member for controlling the initial operation of said power control member at a predetermined speed, and means controlled by the shifting of the shifter from starting position to hold the power control member in its operated position independently of the centrifugal member.

2. In a transmission mechanism for motor vehicles including a throttle controlled engine; a throttle control member, a change speed gearing embodying an element shiftable in opposite directions from central position to effect different speeds, shifting means including a motor having a movable element, a shifter connected thereto and to the shiftable element, a power system including branches connected to the motor to supply power thereto to shift the movable motor member from central position in opposite directions, control members in said branches respectively, a centrifugal member responsive to the output speed of the gearing, means controlled by the throttle control member when in throttle closing position and by the centrifugal member at different predetermined speeds to initially operate said control members in the branches at different predetermined vehicle speeds to permit the flow of power to the motor through one or the other of said branches and actuate the shifter in one direction or the other from central position, and means controlled by the shifting of the shifter from central position in either direction to hold the operated control member in either branch in the position it has been operated through the centrifugal member independently of the centrifugal member and to prevent the operation of the control member in the other branch.

3. In a transmission mechanism for motor vehicles including a throttle controlled engine; a throttle control member, a change speed gearing including input and output shafts, a hydraulic coupling between the engine and the input shaft, the gearing embodying a balking ring clutch shiftable in opposite directions from neutral to effect drives through different gear trains, shifting means including a motor having a movable element, a shifter connected thereto and to the balking ring clutch, a power system including branches connected to the motor to supply power thereto to shift the shiftable element from central position in opposite directions, control members in said branches respectively, a centrifugal member responsive to the output speed of the gearing, means controlled by the throttle control member when in throttle closing position and by the centrifugal member at different predetermined speeds to initially operate said control members in the branches at different predetermined speeds and permit the flow of power to the motor through one or the other of said branches and actuate the shifter in one direction or the other from central position, means controlled by the shifting of the shifter from central position in either direction to hold the operated control member in each branch in the position it has been operated by the centrifugal member independently of the centrifugal member and to prevent the operation of the control member in the other branch, and means operated by the throttle control member and by the initial movement of the shifter carrying the balking ring clutch in balking position to retard the input shaft to effect the crossing of the speeds of the two parts to be clutched together, the last means being released by the shifting in of the balking ring clutch beyond balking position.

4. In a transmission mechanism for motor vehicles including a throttle controlled engine; a throttle control member, a change speed gearing embodying an element shiftable in opposite directions from central position to effect different speeds, shifting means including a motor having a movable element, a shifter connected thereto and to the shiftable element, a power system including branches connected to the motor to supply power thereto to shift the movable motor member from central position in opposite directions, control members in said branches respectively, a centrifugal member responsive to the output speed of the gearing, means controlled by the throttle control member when in throttle closing position and by the centrifugal member at different predetermined speeds to initially operate said control members in the branches at different predetermined vehicle speeds to permit the flow of power to the motor through one or the other of said branches and actuate the shifter in one direction or the other from central position, and means controlled by the shifting of the shifter from central position in either direction to hold the operated control member in either branch in the position it has been operated by the centrifugal member, independently of the centrifugal member, and to prevent the operation of the control member in the other branch, and an additional driver controlled member operable to cut off the flow of power through the centrifugally controlled means to said control members in the branches, whereby upon the release of the throttle control member to throttle closing position, the motor is de-energized and returns to central position.

5. In a transmission mechanism for motor vehicles including a throttle controlled engine and a throttle control member, a change speed gearing embodying an element shiftable in opposite directions from central position to effect different speeds, shifting means including a pressure operated motor embodying a casing and a movable element therein, a shifter connected thereto and to the shiftable element, a pressure system including branches connected to the motor casing on opposite sides of the movable member therein, valves in said branches openable individually at different vehicle speeds, and means controlled by the predetermined output speed of the gearing and the throttle control member to effect the opening of the valves alternately and the closing of either when the other is open, and means controlled by the shifter for holding the operated valve open independently of the vehicle speed controlled means.

6. In a transmission mechanism for motor vehicles including a throttle controlled engine, a throttle control member, a change speed gearing embodying an element shiftable in opposite directions from central position to effect different speeds, shifting means including a pressure operated motor embodying a casing and a movable member therein, a shifter connected thereto and to the shiftable element, a pressure system including branches connected to the motor casing on opposite sides of the movable member therein, means tending to return the movable member to central position, valves in the branches, and means controlled by the predetermined output speed of the gearing and the throttle control member to effect the alternate operation of the valves and the closing of either valve when the other is open, and means controlled by the shifting of the shifter to hold the operated valve in operated position and cut out the control of the other valve by the throttle member except when the throttle member is returned to engine idling position.

7. In a transmission mechanism for motor vehicles including a throttle controlled engine, a throttle control member, a change speed gearing embodying an element shiftable in opposite directions from central position to effect different speeds, shiftable means including a pressure operated motor including a casing, a movable element therein, a shifter connected thereto and to the shiftable element, a power pressure system including branches connected to the motor casing on opposite sides of the movable member therein, when in central position, valves in said branches, electro-responsive means for opening the valves, branch circuits in which the said means is connected, switches controlled by different predetermined output speeds of the gearing in each branch circuit, a throttle member controlled switch closing both branches when in throttle closing position and relay switches in each branch closable by the shifting of the shifter out of central position, one being closed when the shifter is shifted in one direction and the other when the shifter is shifted in the opposite direction, to hold the electro-responsive device in circuit therewith energized, the circuits to the relay switches being closed by the throttle controlled switch when in throttle opening position and opened by the releasing of the throttle member to throttle closing position.

8. In a transmission mechanism for motor vehicles including a throttle controlled engine, a throttle control member, a change speed gearing embodying an element shiftable from starting position into motion transmitting position, shifting means including a pressure operated motor embodying a casing and a movable element therein, a shifter connected thereto and to the shiftable element, a pressure system including a branch connected to the motor casing on one side of the movable member, and a normally closed valve in said branch, a centrifugal member responsive to the output speed of the gearing, means controlled jointly by the throttle member when in throttle closing position and by the centrifugal member, for controlling the initial opening of the valve at a predetermined speed, and means controlled by the shifting of the shifter from starting positon to hold the valve open independently of the centrifugal member.

9. In a transmission mechanism for motor vehicles including a throttle controlled engine, a throttle control member, a change speed gearing embodying an element shiftable in opposite directions from central position to effect different speeds, shifting means including a pressure operated motor embodying a casing and a movable element therein, a shifter connected thereto and to the shiftable element, a pressure system including branches connected to the motor casing on opposite sides of the movable member therein, when in central position, a normally closed valve in each of said branches, a centrifugal member responsive to the output speed of the gearing, electro-responsive devices for operating each of the valves, electric circuits, each including a switch closable by the centrifugal member, the switches being operable at different speeds of the centrifugal member, a switch common to both circuits and operable by the throttle member and being closed only when the throttle control member is in throttle closing position and common to both the centrifugally controlled switches, the throttle member operated switch being operable by the throttle member to a second closed position upon throttle opening operation thereto, a circuit controlled thereby when in second position, said circuit having branches, each branch having a normally open switch therein to one electro-responsive device and its companion centrifugally operated switch, and means operable by the shifting of the shifter in one direction from central position to close one of said normally open switches only, and when shifted in the opposite direction from neutral to close the other normally open switch only, and thereby establish a stick circuit for the energized electro-responsive device around its companion switch operated by the centrifugal member, to hold said device operated while the throttle member is in second position.

10. In a transmission mechanism for motor vehicles including a throttle controlled engine, a throttle control member, a change speed gearing embodying an element shiftable in opposite directions from central position to effect different speeds, shifting means including a pressure operated motor embodying a casing and a movable element therein, a shifter connected thereto and to the shiftable element, a pressure system including branches connected to the motor casing on opposite sides of the movable member therein, when in central position, a normally closed valve in each of said branches, a centrifugal member responsive to the output speed of the gearing, electro-responsive devices for operating each of the valves, electric circuits, each including a switch closable by the centrifugal member, the devices being operable at different speeds of the centrifugal member, a switch common to both circuits and operable by the throttle member and being closed only when the throttle control member is in throttle closing position and common to both the centrifugally controlled switches, the throttle member operated switch being operable by the throttle member to a second closed position upon throttle opening operation thereof, a circuit controlled thereby when in second position, said circuit having branches, each branch having a normally open switch therein to one electro-responsive device and its companion centrifugally operated switch, and means operable by the shifting of the shifter in one direction from central position to close one of said normally open switches only, and when shifted in the opposite direction from neutral to close the other normally open switch only, and thereby establish a stick circuit for the energized electro-responsive device around its companion switch operated by the centrifugal member, to hold said device operated while the throttle member is in second position, and an additional driver operated switch normally in series with the switch operated by the throttle control member when in throttle closing position and operable into a second closed position in circuit with the centrifugally closable switches.

11. In a transmission mechanism for motor vehicles including a throttle controlled engine, a throttle control member, a change speed gearing including input and output shafts, and change speed gear trains between them, a hydraulic coupling between the engine and the input shaft, the gearing embodying a balking ring clutch shiftable in opposite directions from central position to effect speed changes through different gear trains, shifting means including a pressure operated motor embodying a casing and a movable element therein, a shifter connected thereto and to the balking ring clutch, a fluid pressure system including branches connected to the motor casing on opposite sides of the movable member therein, when in central position, valves in said branches, means controlled jointly by the vehicle speed and the throttle control member to effect the alternate operation of the valves and the closing of either valve when the other is open, means controlled by the shifting of the shifter from central position to hold the open valve opened, and means controlled by the throttle member when in throttle closing position and by the shifter when in central position for effecting the crossing of the speeds of the two parts to be clutched together and the unlocking of the balking ring clutch to permit the completion of the shifting thereof when the speeds cross.

12. In a transmission mechanism for motor vehicles including a throttle controlled engine, a throttle control member, a change speed gearing embodying an element shiftable in opposite directions from central position to effect different speeds, shifting means including a pressure operated motor embodying a casing and a movable element therein, a shifter connected thereto and to the shiftable element, a pressure system including branches connected to the motor casing on opposite sides of the movable member therein, when in central position, normally closed valves in said branches, a centrifugal member responsive to the output speed of the gearing, means controlled by the throttle control member when in throttle closing position and by the centrifugal member to initially open said valves at different predetermined speeds, and means controlled by the shifting of the shifter from central position to hold open the valve, which has been initially opened by the centrifugal member, independently of the centrifugal member and prevent the opening of the other valve.

13. In a transmission mechanism for motor vehicles including a throttle controlled engine, a throttle control member, a change speed gearing embodying an element shiftable from starting position into motion transmitting position, shifting means including a pressure operated motor embodying a casing and a movable element therein, a shifter connected thereto and to the shiftable element, a pressure system including a branch connected to the motor casing on one side of the movable member therein, when in starting position, a normally closed valve in said branch, a centrifugal member responsive to the output speed of the gearing, electro-responsive means for operating said valve, an electric circuit including a branch having a switch therein closed when the throttle member is in throttle closing position and openable by the opening operation of the throttle control member, a normally open switch closable by the centrifugal member at a predetermined speed, a second circuit closable by the opening movement of the throttle member and having a normally open switch therein closable by the shifting of the shifter and the shiftable element into motion transmitting position to maintain the electro-responsive device energized, when the switch controlled by the centrifugal member is open.

14. In a transmission mechanism for motor vehicles including a throttle controlled engine, a throttle control member, a change speed gearing including input and output shafts, and change speed gear trains between them, a hydraulic coupling between the engine and the input shaft, the gearing embodying a balking ring clutch shiftable in opposite directions from central position to effect speed changes through different gear trains, shifting means including a pressure operated motor embodying a casing and a movable element therein, a shifter connected thereto and to the balking ring clutch, a fluid pressure system including branches connected to the motor casing on opposite sides of the movable member therein, when in central position, valves in said branches, means controlled jointly by the vehicle speeds and the throttle control member to effect the alternate operation of the valves, means controlled by the shifting of the shifter from central position to hold the open valve opened, brake means controlled by the throttle control member when in closed position and by the shifter when in central balking position for effecting the crossing of the speeds of two parts to be clutched together, and the unlocking of the balking ring clutch, and means for controlling the application of the brake when the shifter is in shifted position.

15. In a transmission mechanism for motor vehicles including a throttle controlled engine, a throttle control member, a change speed gearing including input and output shafts, and change speed gear trains between them, a hydraulic coupling between the engine and the input shaft, the gearing embodying a balking ring clutch shiftable from central position to effect the drive through one of the gear trains, shifting means including a pressure operated motor embodying a casing and a movable member therein, a pressure system including a branch connected to the motor casing on one side of the movable member therein from starting position, a valve in said branch, a throttle operating member, a centrifugal member responsive to the output speed of the gearing, means controlled jointly by the centrifugal member and the throttle control member, when in throttle closing position to initially open the valve and effect shifting of the balking ring clutch into balking position upon opening operation of the throttle member, a pressure operated brake to retard the rotation of the input shaft upon closing of the throttle and effect the crossing of the speeds of the two parts to be clutched together, and hence the unlocking of the balking ring clutch, permitting the shifting-in of the clutch to be completed by the motor, means operable by the shifting-in operation to release the brake, means also operated by the shifting-in operation to hold the valve open independently of the centrifugal control member, when the throttle member is out of throttle closing position, the last means being released upon the operation of the throttle control member to throttle closing position, and means for returning the shifter to starting position, when the force tending to hold it in any shifted position is released by the closing of the valve.

CARL D. PETERSON.
ALBERT H. DEIMEL.